No. 666,741. Patented Jan. 29, 1901.
A. & E. DES CRESSONNIERES.
PROCESS OF MAKING SOAP.
(Application filed Feb. 23, 1898.)
(No Model.)
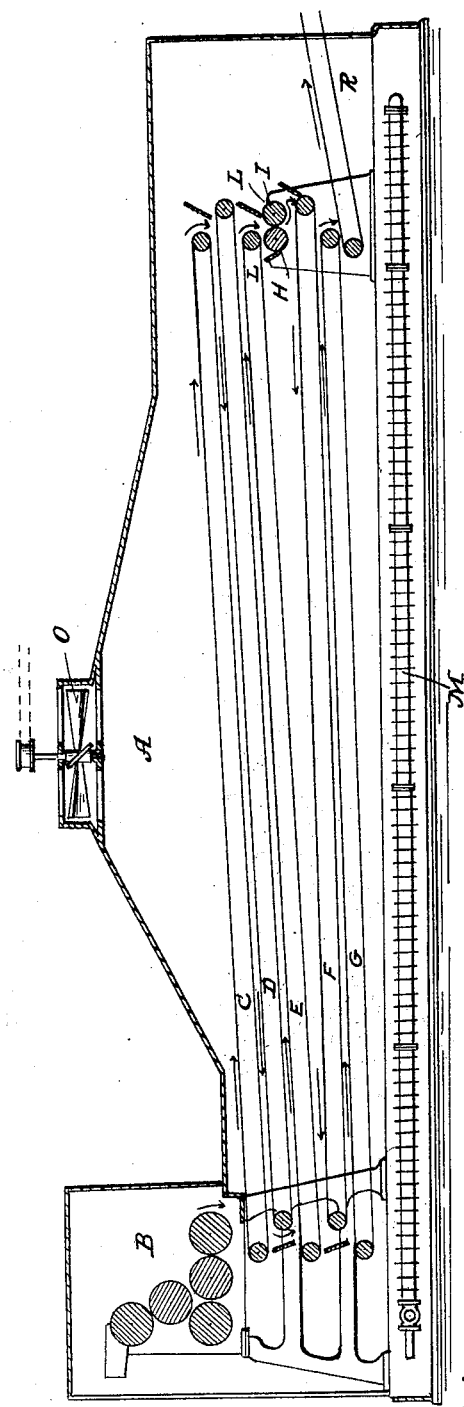
Witnesses
Sam R. Turner
A. M. Long
Inventors
Anatole des Cressonnieres.
Ernest des Cressonnieres.
B. Singer
Attorney

UNITED STATES PATENT OFFICE.

ANATOLE DES CRESSONNIERES AND ERNEST DES CRESSONNIERES, OF BRUSSELS, BELGIUM.

PROCESS OF MAKING SOAP.

SPECIFICATION forming part of Letters Patent No. 666,741, dated January 29, 1901.

Application filed February 23, 1898. Serial No. 671,365. (No specimens.)

*To all whom it may concern:*

Be it known that we, ANATOLE DES CRESSONNIERES and ERNEST DES CRESSONNIERES, subjects of the King of Belgium, residing in Brussels, in the Kingdom of Belgium, have invented a new and useful Improvement in Processes of Manufacturing Soap, of which the following is a full, clear, and exact specification.

This invention relates to an improvement in the manufacture of soap.

The improvement in the manufacture of soap in question consists, essentially, in the intermingling of the material during drying—that is to say, an additional working or trituration of the paste—having the effect of changing or renewing the surfaces, or, in other words, of turning to the outside the layers hitherto inside the sheets, flakes, shavings, or other divided forms in which the paste is exposed to drying, so that the drying proceeds more uniformly over all the parts of the paste in contradistinction to that which occurs in the ordinary process, in which the drying action is invariably exercised upon the outer layer alone during the whole period of the drying.

In order to obtain the requisite degree of dehydration in relation to the total quantity of the product, its exposure in the drying apparatus must be of a corresponding duration. Now as in the ordinary process the drying action proceeds continuously upon the same external layer this layer soon becomes a hard and impermeable crust, opposing the normal action and retarding the result, and consequently prolonging the period of time required for the drying and requiring an increased amount of heat, and which, above all, has the drawback of destroying the homogeneousness of the material or mass, which is thus dried irregularly throughout its various layers, and which consequently affects the quality of the paste in a manner hardly to be afterward remedied. The process of the intermingling of the paste in the course of drying entirely obviates these various inconveniences—that is to say, the material dries uniformly without forming any crust, the period of drying is shortened, heat is economized, and, above all, the quality of the paste is superior, and it requires no subsequent improvement.

It must be understood that the new process is applicable to all systems of manufacture and of drying, because its effect will always be proportional to the conditions in which it is carried out; but its advantages are more specially recognizable in its application to the system of continuous manufacture of our invention, in direct combination with which it will now be described by way of example. For this purpose it should be recollected that this process has for its essential principle the continuity of the operations of cooling, milling, and drying of the soap-paste, which paste is delivered in the warm and plastic state into a hopper mechanism having as its movable bottom the upper cylinder of the first milling-roll. It then passes through the series of cylinders which compose the machine, being thoroughly milled in its progress, and delivered finally in the form of chips or shavings to the carrying-bands of the drying mechanism placed immediately in front of the milling mechanism and in which a heating device of any suitable kind maintains the temperature at the given point during the drying, in the course of which the intermingling of the material, as above set forth, is caused. For this purpose use is made of a very simple contrivance, which consists in submitting the chips or flakes of soap to a further milling after proceeding a part of their course upon the drying-bands for the purpose of causing them to complete the remainder of the journey after the intermingling or renewal of the surfaces by reason of their passage into a milling mechanism of suitable construction placed in the interior of the stove between two groups of bands, preferably superimposed one above the other and corresponding the one to the first phase and the other to the second phase of the drying. In order to define these ideas more clearly, we have indicated diagrammatically an instance of the arrangement of the drying and intermingling mechanism following the original milling-machine in the accompanying drawing, in which the letter B indicates the original milling-machine, having a series of cylinders causing originally the aggregation of the hot paste and the progressive milling thereof, while the letter A indicates the stove, heated by a suitable heating device M and surmounted by a ventilating-van O, discharging at the top the air charged with the moisture removed from the soap traveling over the bands C D E F G of the drying mechanism. The last cylinder of the milling-machine B delivers to the first band C the soap in the form of flakes and about at the temperature of congealing. From this band C it passes to the band D and from that to E. During its course the surrounding air, being heated to the necessary temperature, evaporates the water from the exterior layers of the flakes, which thus arrive at the end of the band E without being covered by a hard and impermeable crust, as usually happens, and it is while they are in this normal state that they pass between the cylinders H and I of the intermingling milling-machine, whereby their surfaces are renewed. This mechanism is so placed as to be between the bands C D E and the bands F G and to deliver to this latter group the soap reworked by the milling-rolls and presenting to the heated air chips or shavings formed by means of the scrapers L L and having new surfaces, enabling the evaporation of the whole surplus moisture of the paste without forming hard dry crusts. The scrapers L L are placed so as to detach the paste from the cylinder in that part of the rotation from below upward, so as to facilitate the immediate fall of the chips and to prevent an accumulation of material upon the scraper. When they reach the end of the last band G, the chips are carried away by the band R, which conducts them to the place for the further operations.

It is obvious that in place of a single milling intermediate between two groups or bands there may be arranged several and the groups of bands arranged correspondingly according to need and according to the nature of the material to be treated. Moreover, the bands may be grouped either side by side or the one after the other; but it will be found in practice that the superposed arrangement is much the most advantageous and generally preferable.

Having now particularly described and ascertained the nature of our said invention and in what manner the same is to be performed, we declare that what we claim is—

In the process of manufacturing soap, milling the material so as to form chips, drying the surface of said chips, reworking the chips so as to expose new surfaces, and submiting the chips to further drying, substantially in the manner described.

ANATOLE DES CRESSONNIERES.
ERNEST DES CRESSONNIERES.

Witnesses:
AUG. JOERISRE,
GREGORY PHELAN.